United States Patent Office 3,737,332
Patented June 5, 1973

3,737,332
CLOSED CELL CLAY FOAM AND PROCESS
FOR PREPARING SAME
Paul S. Sennett and James P. Olivier, Macon, Ga., and Sydney Ross, Troy, N.Y., assignors to Freeport Minerals Company, New York, N.Y.
No Drawing. Filed June 25, 1971, Ser. No. 156,997
Int. Cl. C04b 31/20
U.S. Cl. 106—71                                    12 Claims

ABSTRACT OF THE DISCLOSURE

A clay foam characterized by a closed cell structure and the ability, in its calcined state, to float in water is described. The gas bubbles of the foam are substantially completely encapsulated by walls formed from clay particles. The foam is prepared by generating a foaming gas in an aqueous dispersion of clay particles to which has been added a minor amount of a fatty amine as a foaming agent. A variety of inorganic filler materials can be incorporated into the foam in order to alter or impart new properties to the foam. The foam can be calcined to further alter its properties. The foam has many uses including use as a refractory brick.

BACKGROUND OF THE INVENTION

This invention relates to a closed cell clay foam, in either a calcined or uncalcined state, wherein the bubbles of gas entrapped within the pores of the foam are substantially completely enclosed by walls made from clay particles.

British Pat. 986,635 describes a calcined clay foam which is prepared by generating a foaming gas, such as air, in an aqueous dispersion of a clay to which a foaming agent such as sodium alkyl naphthalene sulphonate or saponin has been added. However, the calcined clay foam described in the British patent is an open cell foam in which the clay particles do not form a wall around the gas bubbles of the foam. In the foam of the British patent, the clay particles are simply disposed between the bubbles of the foam, i.e., the clay particles are found in the struts of the foam structure. On the other hand, the foam of this invention exhibits a closed cell structure wherein the gas bubbles of the foam are enclosed within walls formed from the clay particles. Perhaps the most apparent indication of the difference between the nature of the foam of this invention and that described in the British patent is that the calcined foam of this invention, because of its closed cell structure, floats for appreciable periods of time in water whereas the calcined foam of the British patent, because of its open cell structure which allows access of the water into the pores of the foam, sinks rapidly when placed in water. These differences between the foam of this invention and that of the British patent have been determined experimentally and are presented and discussed in greater detail hereinbelow in Comparative Example 1.

The reason for the difference in cell structure between the British patent foam and that of this invention is believed to be due to the nature of the foaming agent used in the preparation of the foam. This invention employs as foaming agents fatty amines, whereas the British patent uses foaming agents of an entirely different chemical species, i.e., sodium alkyl naphthalene sulfonates and saponin.

A clay platelet has two faces which differ in their hydrophobicity characteristics. The $SiO_2$ face is more hydrophobic than is its opposed $Al_2O_3$ face. It is believed that the closed cell foam of this invention results from the physical absorption of the foaming agents specified in this invention on one side of the clay platelet in such a manner as to cause the more hydrophobic side of the platelet to become oriented around the gas bubbles generated during the foaming process to form a wall of clay platelets about the bubble, with water being forced to the outside of the system. The result is that a closed cell structure foam is produced wherein the gas bubbles are substantially completely enclosed by a wall of clay particles. Since the gas bubble is trapped within the foam structure by this wall, access into and out of such bubbles is substantially decreased as compared to an open cell foam structure wherein the bubbles are not enclosed by a wall. The unique behavior of certain foaming agents in producing an orientation of clay platelets which results in a closed cell as opposed to an open cell clay foam is made apparent by a comparison with foams produced using the different foaming agents described in British Pat. 986,635, as disclosed in greater detail hereinbelow.

The exact mechanism by which the clay foam of this invention is produced is not clearly understood; any theories set forth in the mechanism involved, therefore, are not intended to be binding. However, as will be made clearer hereinbelow, the nature of the foaming agent employed is of great significance insofar as the nature of the cell structure of the foam is concerned.

It is, therefore, an object of this invention to provide a clay foam which is characterized by a closed cell structure wherein the gas bubbles of the foam are substantially completely enclosed within a wall made from the clay particles.

It is another object of this invention to provide a closed cell clay foam which is resistant to rapid penetration of liquids into the pore structure of the foam.

It is another object of this invention to provide a clay foam wherein gases are entrapped within the pores of the foam to thereby improve the heat insulating properties of the foam.

It is another object of this invention to provide a closed cell clay foam having use as a low cost heat insulating material.

It is another object of this invention to provide a low cost closed cell clay foam to which a host of inorganic filler materials can be added in order to impart additional or new desirable properties to the foam.

It is another object of this invention to provide a low cost closed cell clay foam having incorporated therein inorganic refractory materials which render the foam extremely useful as an inexpensive refractory material.

It is another object of this invention to provide a process for preparing such closed cell clay foams which relies upon the use of unique fatty amines as foaming agents.

These and other object of this invention will be apparent to one skilled in the art from a total consideration of this disclosure.

SUMMARY OF THE INVENTION

Briefly, the above objectives are accomplished, in accordance with this invention, by preparing an aqueous dispersion of clay particles and thereupon adding to the dispersion at least about 0.001%, and preferably about 0.001 to about 0.1% by weight, based on the dry weight of clay present in the dispersion, of a foaming agent selected from the group consisting of fatty amines, the hydrocarbon portion of which contains at least 8 carbon atoms, and then introducing a gas or generating a gas in situ to produce gas bubbles within the dispersion about which the treated clay particles orient to produce a closed cell clay foam.

The foam contains substantially all of the fatty amine added to the clay dispersion and has a closed cell structure. By a "closed cell structure" is meant that the bubbles of foaming gas entrapped within the pores of the foam are substantially completely encased within a wall formed of clay particles. The foam, after calcining, is further characterized by its ability to float in water which is maintained at temperatures below the boiling point (212° F.) of water. In cold tap water (60–80° F.), for example, the calcined foams have floated for at least about 20 weeks.

The foam has a variety of uses. Because of the entrapped gas bubbles contained therein it is an excellent heat insulating material. The foam can be further modified by inclusion therein of a wide variety of inorganic filler materials such as, for example, refractory materials which impart additional desirable properties and uses to the foam of this invention. Moreover, for some applications, it is desirable to further calcine the foam in which case substantially all of the fatty amine foaming agent contained in the foam is removed during the calcination to produce a foam which is substantially free of fatty amine foaming agent.

In general, it has been found that the foams of this invention have apparent bulk densities ranging from about 1 to about 12 pounds per cubic foot depending, for the most part, upon the nature of the additives present, the method of generation, and the size of the bubbles. After calcination at 1850° F., the foams of this invention illustratively have abrasion values of about 120 to 150 milligrams, specific gravities in the range of about 2.70, shrinkage factors of about 30 to 45%, and Tappi brightness values of from about 90 to 93.

DESCRIPTION OF THE PREFERRED EMBODIMENTS

The closed cell clay foam of this invention is conveniently prepared by first forming a dispersion of clay particles in water. The solids content of the clay slips can vary considerably, illustratively from about 20% to 70% by weight, with suitable foams being produced throughout this range. The exact solids content employed depends upon the type of clay used and the nature of the foam product desired. Foams produced at low solids content are usually weaker than those produced at higher solids content. The apparent bulk density of the foam is often lower when low solids clay slips are used; however, this property is also affected by other factors such as the method of generating the foam and the nature and amount of additive within the foam.

The solids content of the resulting foam approximates that of the clay slip from which it is prepared, occasionally running 1 to 2% in excess of the solids content of the clay slip. Generally, it is preferred to work with high solids concentrations (60% to 70%), in the clay slip. When low solids clay slips are used, no dispersant is ordinarily necessary for the clay. In this regard, a low solids content is less than about 30%. When the solid content of the slip exceeds 30%, it becomes desirable to use a dispersant for the clay. Any of the well known clay dispersants such as, for example, tetrasodium pyrophosphate or sodium hexametaphosphate, can be used in the usual amounts known to those skilled in the art.

A wide variety of clays can be employed to prepare foams in accordance with this invention. Illustrative clays are untreated or treated (i.e., calcined, delaminated) English or Georgia filler and coating clays. One preferred clay is a delaminated clay of the type disclosed in U.S. Pat. 3,171,718 and available commercially from The Freeport Kaolin Company under the designation Nuclay®. Another preferred clay is also available commercially from The Freeport Kaolin Company under the designation Lustra® and is a fine particle (92% less than two microns) Kaolin clay produced from the sedimentary deposits of Central Georgia by water fractionation, washing and chemical purification.

After the clay slip is formed, the fatty amine foaming agent is added to the slip in an amount ranging from about 0.001 to 0.1% by weight, based on the dry weight of clay contained in the slip. The amount of foaming agent added varies somewhat depending upon the surface area of the clay employed; at least enough foaming agent is generally provided to absorb on substantially the entire exposed surfaces of the clay. The amount of foaming agent used is preferably in the range of .01 to .02% by weight. One or more fatty amines can be employed as the foaming agent.

It has been found that if a closed cell clay foam is to be produced, the foaming agent must be a fatty amine. A variety of such useful amines and procedures for their preparation are set forth in The Kirk-Othmer Encyclopedia of Chemical Technology, vol. 2, Interscience Publishers, New York (1963), pages 127–138, said publication incorporated herein by reference. In general, the term "fatty amines" refers to the higher normal aliphatic amines and, illustratively, those derived from naturally occurring saturated or unsaturated fatty acids or mixtures thereof. Moreover, the term "fatty amines" includes only monoamine type materials and does not include the various fatty diamines.

The fatty amines are represented by the formula:

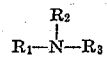

wherein each individual R group can be identical or dissimilar provided that at least one of the R groups contains a sufficient number of carbon atoms to impart a fatty nature to the amine. Thus, the exact nature and type of the various R groups is not significant provided that at least one of the R groups is a fatty group. Illustratively, the amines useful in this invention are those wherein the number of carbon atoms in at least one R group is sufficient to produce an amine which, at room temperature, is a fatty solid and not a liquid. It has been found that if at least one of the R groups contain at least about 8 carbon atoms, and preferably between 8 to 35 carbon atoms, the amine is usually a fatty solid at room temperature and functions as an effective foaming agent in the production of closed cell clay foams in accordance with this invention.

The fatty amines can be of either the primary, secondary or tertiary type. Illustrative primary amines include lauryl amine (dodecylamine), stearyl amine (octadecylamine) and tallow amine. Illustrative secondary amines include dihexadecylamine and dicoco amine. Illustrative tertiary amines include tridodecylamine and N-methyl dihydrogenated tallow amine.

Primary amines are preferred, with lauryl amine (dodecylamine) representing a preferred species of a primary fatty amine.

A variety of inorganic filler materials can be incorporated into the foam in order to impart additional desirable properties to the foam. The addition of such additives is most conveniently accomplished by adding them to the clay slip prior to the generation of the foaming gas in the slip. Such inorganic fillers can be in either particulate or fibrous form. Illustrative fillers include calcium carbonate, barium sulfate, glass in the form of fibrous or thin platelets, vermiculite, mica, feldspar, refractory materials such as asbestos, magnesia and alumina; soluble additives such as sodium silicate can also be added. If a colored foam is desired, any of the well known inorganic coloring pigments can be used including iron oxides, zinc chromate, cobalt blue, ultramarine blue, etc.

The amount of additives incorporated into the clay can vary substantially depending upon the nature of additive and the application envisioned for the foam. In general, the amount of additive does not exceed about 45% by weight based on the dry weight of the finished foam. The amount of inorganic filler added to the foam is, illustratively, in the range of 2 to 20% by weight. The filler is added to the agitated clay slip prior to the foaming step.

The clay slip, including the foaming agent, and with or without the presence of an inorganic filler, as desired, is then formed into the foam of this invention by the introduction of, or the generation of, a foaming gas within the slip. A convenient way of forming the foam is to introduce small air bubbles into the slip using conventional equipment for this purpose such as, for example, spargers, fritted Pyrex discs, flotation cells, or other such suitable equipment known to the art. Air is preferred only because of its convenience; other gases such as, for example, nitrogen, argon, carbon dioxide, etc., can also be used as the foaming gas. The foaming gas may also be generated in situ within the dispersion by adding thereto any of the numerous known chemicals which possess the capability of generating a foaming gas by chemical reaction or otherwise when added to the clay slip. Techniques for such in situ generation of foaming gas are known to the art and need not be repeated herein.

When the foaming operation is completed, it is convenient to remove the foam from the vessel and drain excess liquid therefrom. The foam is then dried such as by heating it at about 100° C. It is to be appreciated that the properties of the foam vary depending upon such factors as the solids content of the clay slip, the quantity and nature of foaming agent used, the method of foaming used, and the quantity and nature of additives incorporated into the foam. However, the foams produced in accordance with this invention are of a closed cell structure wherein gas bubbles are entrapped within the pores of the foam by a wall of clay particles which substantially surrounds the gas bubbles. Moreover, it has been found that the foams of this invention will, after calcining, float in water for substantial periods of time as a result of their closed cell structure. This property is not observed with the calcined clay foams produced in accordance with the teaching of British Pat. 986,635 referred to above, for the reason that this foam, by virtue of its open cell structure, loses its buoyancy when the water rapidly enters the pores of the foam to displace the gas therefrom.

The foam product of this invention is preferably calcined. Calcining immobilizes the clay platelets in the walls of the foam bubbles, making the foam appreciably stronger and providing a structure whose cells resist penetration by liquids and gases.

When the foam is calcined, the foaming agent dispersed throughout the foam is removed leaving a closed cell clay foam comprising clay and whatever inorganic filler, if any, which may have been added to the clay. The foams are typically calcined at temperatures in the range of 1000 to 2800° F., depending upon the fluxing agents added during the calcination. Some shrinkage of the foam does occur during the calcination generally depending on the solids content of the clay slip from which it was produced. Less shrinkage occurs when higher solids content are employed in the clay slip.

The foams of this invention are rigid, strong structures, whose properties can be modified not only by incorporation of additives into the foam but also by subsequent treatments of the foam. For example, it has been found that the strength of the foam can be increased substantially by impregnating it with an epoxy resin.

The clay foams of this invention have excellent heat insulating properties and provide a suitable low cost replacement for refractory brick. The foam can also be used as an insulating material by affixing a layer of the foam to wall paneling or such, or disposing a layer of the foam between two such panels, to form a single unit suitable for convenient use in building construction.

The following examples are provided to further illustrate the invention:

EXAMPLE 1 (Comparative)

This example illustrates the marked difference in the cell structure of foams produced in accordance with this invention (using lauryl amine as the foaming agent) and those produced following the teaching of British Pat. 986,635 (wherein the foaming agent is saponin, a known material described in The Encyclopedia of Chemical Technology, Kirk and Othmar, Interscience, New York, 1954, vol. 12, p. 96 as "glycosides which occur in a variety of plants and are characterized by their foaming action in aqueous solution"). The procedure on page 2, lines 5–52 of the British patent was followed as closely as possible except that in one experiment the foaming agent was lauryl amine and in the other it was saponin.

An attempt was made to produce a foam as described in British Pat. 986,635 using predispersed Gordon No. 70 clay with saponin as the foaming agent. Clay was introduced into clean tap water which was being agitated at low speed with a laboratory mixer. The ratio of clay to water was 70 lbs. of clay to 3 gallons of water (73.6% solids). The clay contained sufficient tetrasodium pyrophosphate (TSPP) to impart minimum clay-water viscosity. To this slurry, 0.20% saponin powder (0.14 lb. per 70 lbs. clay) was introduced. The slurry was placed in a Fagergren Froth Flotation machine and an attempt to produce a foam was made; however, the slurry was too viscous. Sufficient water was added to reduce the percent solids to 70.6% and the slurry was still too viscous to produce a foam. The sample was discarded.

A second attempt was made using Lustra®[1] clay. Although the Lustra clay was predispersed with TSPP, it was necessary to add 0.1% to obtain minimum viscosity. 0.20% saponin powder (0.15 lb. per 70 lbs. clay) was used as the foaming agent. The slurry was transferred to a Fagergren Froth Flotation machine, but was too viscous to generate a foam. Therefore, sufficient water was added to reduce the percent solids to 67.5%. A foam was generated, which was quite stable, but of very low volume. It was placed on a refractory slab and fired for 15 minutes in a pre-heated furnace at 1100° C. (2012° F.). The resulting fired foam had a very porous, open structure similar to that of a sponge.

A foam was then prepared in accordance with this invention using a portion of the same Lustra® sample referred to above. The foaming agent was a 1% solution of lauryl amine in dilute HCl. Only 0.02% lauryl amine (dry weight) was used. The total slip solids was 68.5%. The foam was easily generated in a Fagergren Froth Flotation machine. The foam was quite stable and was of very large volume. The bubbles appeared to be closed; i.e., a large percentage of the clay was in the walls of the bubbles. The foam was placed on a refractory slab and was subsequently fired (calcined) in a preheated furnace for 15 minutes at 1100° C. (2012° F.). Photomicrographs (14×) of the saponin and lauryl amine foams revealed that the saponin prepared foam was an open cell foam whereas the lauryl amine prepared foam of this invention was a closed cell foam consisting almost entirely of bubbles which were enclosed within a wall of clay particles.

Specimens of both the fired foams described above were placed in beakers containing cold water. The saponin prepared foam of the British patent sank to the bottom of the beaker. The lauryl amine prepared foam floated on the surface of the water and continued to float thereon for at least three days.

These results clearly demonstrate that the foam of the British patent is of an entirely different type than that of this invention and that this difference is attributable to the use of the unique foaming agents used in this invention.

---

[1] A commercially available clay of the Freeport Kaolin Co.

EXAMPLE 2

A clay slip containing the foaming agent was prepared by blending the following materials with a laboratory stirrer in the order listed:

| | |
|---|---|
| Water | 3000 g. |
| Delaminated clay [1] | 1000 g. |
| 1% by wt. aqueous solution of lauryl amine | 10 cc. (~10 g.). |

[1] Nuclay—Freeport Kaolin Co.

The resulting clay slip contained about 25% solids and had a pH of about 3.5. The slip was then transferred to a typical flotation cell (Fagergren Laboratory Test Machine) and a foam prepared by bubbling air into the slip. The foam produced was removed from the flotation cell, drained of liquid, dried for several hours at 100° C., and then calcined at about 1250° F. for about one hour. The calcined clay had a closed cell structure and floated for at least about 4 weeks in water at room temperature. Upon examination of the foam under a microscope, it was apparent that the gas bubbles were enclosed by walls made of clay particles.

EXAMPLE 3

The procedure of Example 2 was repeated except that the pH of the slip was about 4.0 and the foam was calcined at 1850° F. for about 1 hour. The calcined clay had properties similar to those of the clay of Example 2.

EXAMPLE 4

The following materials were blended with a laboratory stirrer in the order listed:

| | |
|---|---|
| Water | 2170 g. |
| Delaminated clay [1] | 2170 g. |
| 1% by wt. aqueous solution of lauryl amine | 20 cc. (~20 g.). |
| Tetrasodium pyrophosphate (TSPP) | 2.17 g. |

[1] Nuclay—Freeport Kaolin Co.

The TSPP is added as a dispersant for the clay. The slip had a solids content of 50%. The slip was then foamed with air in a manner identical to that set forth in Example 2 after which the foam was calcined at 1850° F. for one hour. The resulting foam was very stable, of closed cell structure with the clay particles forming the walls of the bubbles, and floated in water at room temperature for at least about 4 weeks. The calcined foam, after grinding, had a Tappi brightness of 90.7 (not tightly packed) and 91.2 (tightly packed). The specific gravity of the ground foam was about 2.70.

EXAMPLE 5

A foam was prepared identically to that described in Example 3 except that the solids content of the clay slip was about 55% instead of 50%. The amount of TSPP used was 0.1% of the weight of the clay. The resulting calcined clay foam had a TAPPI brightness (tightly packed) of 92.9.

EXAMPLE 6

The following materials were blended with a laboratory stirrer in the order listed:

| | Gm. |
|---|---|
| Water | 2000 |
| Fiberfrax® [1] | 50 |
| Feldspar | 150 |
| NuClay® | 2800 |
| Lauryl amine (1% sol'n) | 60 |

[1] Fibers made from fused aluminum silicate and available commercially from Carborundum Corp.

The slip solids were about 60%. The slip was transferred to a Flotation Cell (Fagergren Laboratory Test Machine) and foamed (foam solids 60%) with air bubbles. Prior to pouring the foam into the mold, gentle agitation was applied to reduce the cell size of the resulting foam.

The mold was a wood frame, 14" x 14" x 2", with a screen wire bottom. The purpose of the screen was to allow any slurry drainage to flow away from the foam in order to prevent a hard cake or plate from forming on the bottom of the test sample. After pouring the foam, a bar was drawn across the top to level the sample.

Initially, the sample was dried with infrared heat lamps. To prevent the sample from cracking, the sides were relieved from the wall of the mold. After drying with heat lamps (top and bottom) for approximately one hour, the foam was dried overnight in a forced draft oven at 100° C. The foam was fired at 2200° F. and allowed to soak at that temperature for approximately 3 hours. After cooling, the dimensions of the fired piece was roughly 12.5" x 12.5" x 1". The volume shrinkage during firing was in the approximate range of 35 to 45%. The fired piece was cut into a 12 inch square, with the thickness being approximately one inch (slightly thicker in the middle).

The foam was of closed cell configuration, floated in water, and had the following properties:

| | Thermal conductivity, B.t.u. in./hr. sq. ft. | | | | | | |
|---|---|---|---|---|---|---|---|
| Degrees Fahrenheit | 77 | 212 | 404 | 500 | 800 | 1,300 | 1,800 |
| Apparent density (lb.-ft.$^{-3}$):  9.1 | 0.43 | 0.59 | 0.79 | 1.05 | 1.8 | 3.7 | 6.7 |

In measuring thermal conductivity, no physical change was noticed in the sample and it withstood the heat treatment received in an excellent manner. The above data reveal that the foam has good heat insulating properties. In comparison, kaolin insulating firebrick (density 19 lb. ft.$^{-3}$) has a reported value of 0.6 at 390° F. and a value of 0.25 at 100° F. Asbestos (density 36 lb. ft.$^{-3}$) has a reported value of 2.6 to 5.2 B.t.u. in. per hr. sq. ft. deg. Fahrenheit at similar temperature ranges.

EXAMPLE 7

The following materials were blended in the order listed:

| | Gm. |
|---|---|
| Water | 1950 |
| Lauryl amine (1% solution) | 60 |
| Nephelene Syenite | 150 |
| Fiberfrax (chopped) | 30 |
| NuClay | 2820 |

The solids content of the resulting slip was about 60%. The foaming (foam solids 60%), molding and drying were the same as described in Example 6. The foam was fired in the Globar Kiln at 2300° F. When Cone 8 was reached, the temperature was reset to 2250° F. At Cone 9, the temperature was adjusted to 2200° F. and the sample allowed to soak for two hours.

The shrinkage of this fired piece was roughly the same as reported in Example 6. This sample was cut 12 inches square, with the thickness being approximately one inch (slightly thicker in the middle).

The foam was of closed cell configuration, floated in water, and had the following properties:

| | Thermal conductivity, B.t.u. in./hr. sq. ft. | | | | | |
|---|---|---|---|---|---|---|
| Degrees Fahrenheit | 77 | 212 | 404 | 500 | 800 | 1,300 |
| Apparent density (lb.-ft.$^{-3}$): 6.4 | 0.41 | 0.57 | 0.77 | 1.18 | 2.15 | 4.2 |

The above data reveal that the foam had good heat insulating properties.

EXAMPLE 8

The procedure of Example 2 was repeated except that about 0.75% by weight, based on the weight of clay used, of dental grade Plaster of Paris was incorporated with agitation into the clay slip prior to the foaming step. The resulting foam was strong, had a bulk density of about 10 lb./ft.$^3$, was of closed cell structure, and, after calcining, floated in water at room temperature.

EXAMPLE 9

The procedure of Example 3 was repeated except that about 10% by weight, based on the weight of clay used, of borax was incorporated with agitation into the mixture prior to the foaming step. The resulting foam had a closed cell structure and, after calcining, floated in water at room temperature.

The above examples and other detailed and specific information disclosed hereinabove are illustrative only and such modifications and alterations thereof as would be apparent to one skilled in the art are deemed to fall within the scope and spirit of the claims appended hereto.

What is claimed is:

1. A closed cell foam consisting essentially of clay and a minor amount of a fatty amine.
2. The foam of claim 1 wherein said fatty amine contains at least about 8 to about 35 carbon atoms and is present in an amount ranging from about 0.001% to about 0.1% by weight.
3. The foam of claim 1 wherein said foam contains from about 0.001 to about 0.1% by weight, based on the dry weight of said foam, of lauryl amine.
4. The foam of claim 1 wherein said clay is a delaminated clay.
5. The foam of claim 1 wherein said foam has an apparent bulk density of between 1 and 12 pounds per cubic foot.
6. A process for preparing a closed cell foam consisting essentially of clay and a minor amount of a fatty amine which comprises preparing a mixture consisting essentially of water, clay particles and a minor amount of a fatty amine, and then foaming said mixture.
7. The process of claim 6 wherein said fatty amine contains at least about 8 to about 35 carbon atoms and is present in said mixture in an amount ranging from about 0.001% to about 0.1% by weight, based on the dry weight of clay present in said mixture.
8. The process of claim 6 wherein said fatty amine is lauryl amine and is present in said mixture in an amount ranging from about 0.001% to about 0.1% by weight, based on the dry weight of clay present in said mixture.
9. The process of claim 6 wherein said mixture is foamed by air introduced into said mixture as bubbles.
10. The process of claim 6 further including the step of calcining the foam.
11. The process of claim 10 wherein said calcination occurs at temperatures ranging from about 1000 to 2800° F.
12. The process of claim 6 wherein said clay is a delaminated clay and the solids content of said mixture is about 60 to 70%.

References Cited

UNITED STATES PATENTS

| | | | |
|---|---|---|---|
| 1,944,007 | 1/1934 | Hobart | 106—75 |
| 1,944,008 | 1/1934 | Hobart | 106—75 |
| 2,171,290 | 8/1939 | Hobart | 106—75 |
| 2,235,881 | 3/1941 | France | 106—40 R |
| 2,507,131 | 5/1950 | Winston et al. | 106—88 |

OTHER REFERENCES

Kirk-Othmer, Encyc. Chem. Tech. vol. 2, Interscience Pub., N.Y., 1963, pp. 127–138.

JAMES E. POER, Primary Examiner

U.S. Cl. X.R.

106—40 R, 72, 288 B

PO-1050
(5/69)

UNITED STATES PATENT OFFICE
CERTIFICATE OF CORRECTION

Patent No. 3,737,332          Dated June 5, 1973

Inventor(s) Paul S. Sennett, James P. Olivier and Sydney Ross

It is certified that error appears in the above-identified patent and that said Letters Patent are hereby corrected as shown below:

Column 6, line 30,     "0.15" should be -- 0.14 --.

Signed and sealed this 18th day of December 1973.

(SEAL)
Attest:

EDWARD M. FLETCHER, JR.          RENE D. TEGTMEYER
Attesting Officer                Acting Commissioner of Patents